April 28, 1953   R. L. STALLARD   2,637,014
SPEED CONTROL
Filed Aug. 23, 1949
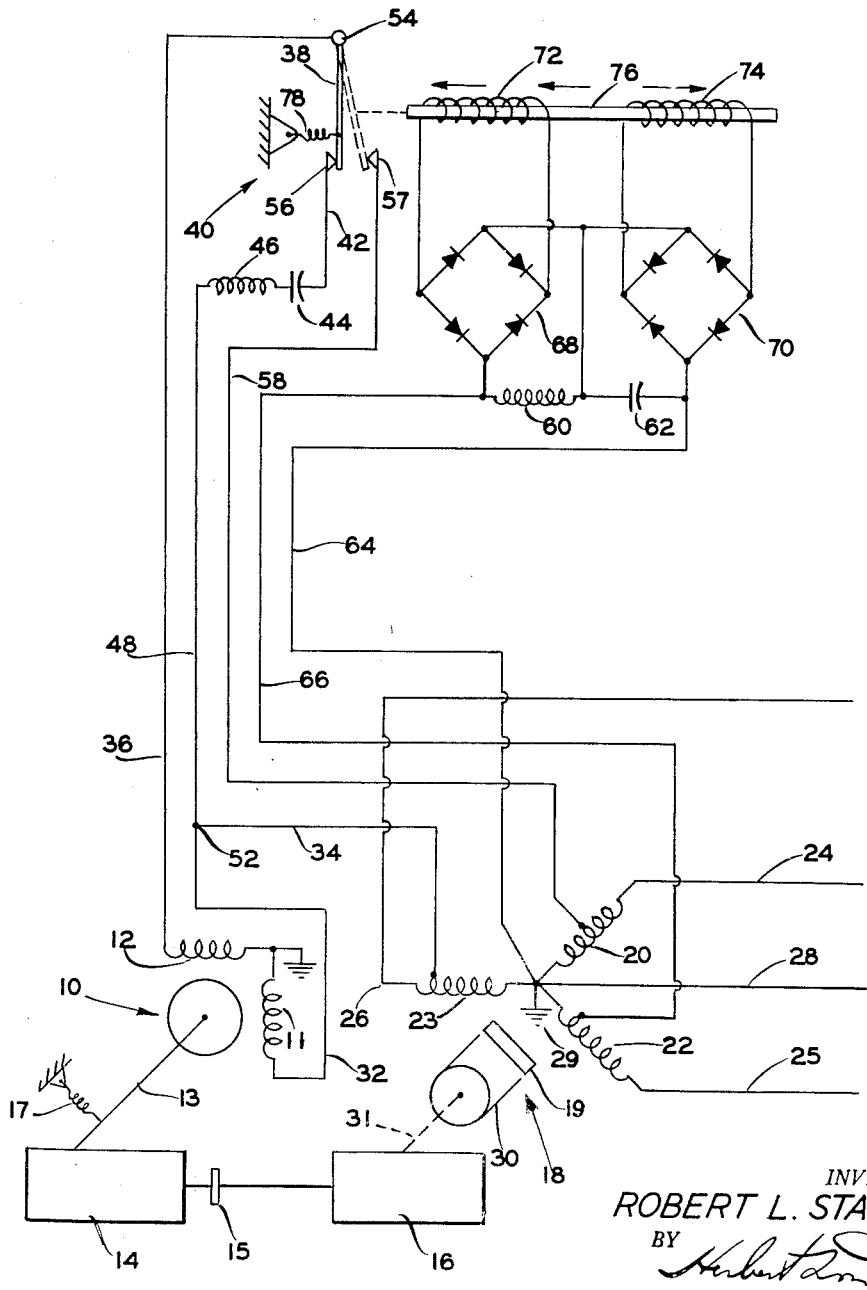
INVENTOR.
ROBERT L. STALLARD
BY
ATTORNEY Patented Apr. 28, 1953

2,637,014

UNITED STATES PATENT OFFICE 2,637,014

SPEED CONTROL

Robert L. Stallard, Glen Rock, N. J., assignor to Bendix Aviation Corporation, Teterboro, N. J., a corporation of Delaware Application August 23, 1949, Serial No. 111,891

5 Claims. (Cl. 322—32)

The present invention relates to frequency responsive apparatus and more particularly to that type suitable for regulating the speed of a motor or generator.

The invention finds particularly utile application in such accessories for aircraft as air driven power supplies wherein it is sought to operate a throttle for controlling the speed of a prime mover, by means of an electric torque motor responsive to the output of an alternator driven by said prime mover.

Such an arrangement is illustrated in copending application filed July 14, 1949, Serial No. 104,714 by Walter D. Teague, Jr. and John S. Jaquith and assigned to the assignee of the present application.

One of the objects of the present invention, therefore, is to provide means for regulating the speed of a prime mover by controlling a throttle by means of an electric motor responsive to the output of an alternator driven by said prime mover.

Another object of the invention is to provide means for preventing an alternator or motor or the like from overspeeding and to do so in a novel and effective manner.

Still another object of the invention is to provide a novel and improved frequency regulator circuit contemplating the use of a resonant circuit to accomplish regulation.

Still another object of the invention is to provide motor regulating means whereby the variable phase of a torque motor is connected to an alternator through a resonant circuit, and an overspeed safety device embodying a second resonant circuit is adapted to cut out said first motor circuit past the resonant frequency of said first circuit.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for the purposes of illustration only and is not to be construed as defining the limits of the invention.

The single figure of the drawing is a diagrammatic view illustrating a control system embodying one form of the invention.

Referring now to the drawing, a two phase actuator motor generally designated by the numeral 10 has a fixed phase winding 11 and a variable phase winding 12. The rotor shaft 13 of the motor 10 controls an air servo 14 which in turn operates a throttle 15, which governs the flow of driving fluid to a prime mover 16. The shaft 13 of the torque motor 10 turns against the force of a spring 17. There is further provided an alternator 18 having a permanent magnet 19 and three phase stator windings 20, 22, and 23, having output conductors 24, 25 and 26, respectively and a center output conductor 28, grounded at 29. The rotor 30 of the alternator 18 is on a common shaft 31 with the prime mover 16, and is driven thereby.

The fixed phase winding 11 of the motor 10 is connected by means of conductors 32 and 34 to the phase winding 23 of the alternator 18, and the variable phase winding 12 of the motor 10 is also connected to the phase winding 23 of the alternator 18 through a series resonant circuit consisting of a conductor 36, the relay arm 38 of a proportional relay 40, the function of which is hereinafter explained, a conductor 42, a capacitance 44, and an inductance 46, and a conductor 48 joining the conductor 34 at post 52. It is to be noted that said circuit from the variable phase winding 12 through conductor 36, relay arm 38, conductor 42, capacitance 44, inductance 46, conductor 48, and conductor 34 to the phase winding 23 of the alternator 18 is operative only when the relay arm 38 of the relay 40 connects terminals 54 and 56, for when the relay arm 38 is in its opposite position, thereby connecting the terminals 54 and 57, the variable phase winding 12 of the motor 10 will be connected to phase winding 20 of the alternator 18 by means of the conductor 36, the relay arm 38, and a conductor 58, thereby cutting out the capacitance 44 and the inductance 46.

Another series resonant circuit including the inductance 60 and the capacitance 62 is connected across center output conductor 28 and phase winding 22 of the alternator 18 by means of conductors 64 and 66. Rectifiers 68 and 70 are connected across the inductance 60 and the capacitance 62, respectively, and the coils 72 and 74 from rectifiers 68 and 70, respectively, are wound about a permanent magnet 76 of the proportional relay 40.

The relay 40 is of a type well known in the art and operates on the direct current output voltage from the rectifiers 68 and 70 impressed upon the coils 72 and 76, respectively. It is well known that the action of a variable frequency voltage on a series resonant circuit is such that at frequencies below the resonance point, the voltage drop across the capacitance is greater than the voltage drop across the inductance, and at frequencies above resonance the voltage drop across the inductance is greater. Use of this phenomenon is profitably made in the present invention, since by connecting the coils 72 and 74 as shown so as to have currents proportional to the voltage drop across the inductance and capacitance, respectively, the operation of the relay arm 38 will be governed by the differential current in the coils 72 and 74, thereby connecting terminal 54 to terminal 56 when the voltage drop across the capacitance is greater, and overcoming the tension in spring 78 to connect terminal 54 to terminal 57 when the voltage drop across the inductance is greater.

As the frequency of the alternator 18 which is driven by the prime mover 16, increases due to an increase in the speed of the prime mover, there will be a proportional increase in the voltage across the variable phase winding 12 as the resonant frequency of the series resonant circuit comprising conductor 36, relay arm 38, conductor 42, capacitance 44 and inductance 46 and conductors 48 and 34 is approached, resulting in a proportional increase in output torque of the shaft 13 of the motor 10. The increased torque will overcome the tension of the spring 17 and actuate the servo 14 to operate the throttle 15 in a speed decreasing direction. The tension in the spring 17 is arranged so that at alternator voltage frequencies below and approaching the resonant frequency of the said circuit including capacitance 44 and inductance 46, the angular position of the rotor shaft 13 is proportional to the frequency of the voltage of the alternator 18 or to the speed of its driving prime mover 16.

It will now be seen that since the rotor shaft 13 of the motor 10 controls the servo 14 to actuate the throttle 15, the speed of the prime mover 16, and, therefore, of the alternator 18 may be controlled by the motor 10, so that with an increase in prime mover speed in excess of a predetermined value affecting switch 38, power to the prime mover is decreased by closing the throttle 15, and with a decrease in prime mover speed below a predetermined value, power available to the prime mover 16 is increased by opening the throttle 15.

The manner in which overspeeding of the prime mover 16 is prevented is as follows:

The capacitance 44 and the inductance 46 are connected in series between the motor 10 and the alternator 18 by means of conductor 36, relay arm 38 and conductors 42, 48, and 34. As speed in the prime mover 16 increases towards a critical value or resonant frequency, the alternator 18 driven thereby will supply a higher frequency voltage to the second resonant series circuit comprising the conductor 66, inductance 60, capacitance 62 and conductor 64. The resonance point of the second resonant series circuit is tuned to the same frequency as the first resonant series circuit including capacitance 44, inductance 46, and the variable phase 12. As the frequency of the voltage across said second resonant circuit goes above the resonance point of the circuit the voltage drop across the inductance 60 will be greater than across the capacitance 62 due to the aforementioned characteristics of series resonant circuits. The coil 74, therefore, will receive a greater rectified voltage than the coil 72 and overcome the magnetic force of coil 72 and the tension of spring 78 to pull the relay arm 38 into contact with terminal 57 thereby cutting out the capacitance 44 and the inductance 46, and connecting the motor 10 directly to the alternator 18 by means of conductor 36, relay arm 38 and conductor 58. A voltage will, therefore, be impressed upon the two phase control motor 10 of proper phase so as to increase the motor torque to cause the servo 14 to close the throttle 15 to its maximum closed position thereby cutting off the supply of driving fluid to the prime mover 16 to decrease the speed of the prime mover.

When the prime mover 16 slows down sufficiently so that the frequency output voltage of the alternator 18 is below the resonance point of the circuit, the coil 72 conversely will overcome the coil 70 so that the relay 40 will again be in position to connect terminal 54 to terminal 56, and the control motor 10 will again be connected to the alternator 18 through the first resonant circuit including inductance 46 and capacitance 44 to thereby provide a proportional control.

It will thus be apparent that there are provided means for regulating the speed of a prime mover by controlling a throttle by means of an electric motor responsive to the output of an alternator driven by said prime mover, and means for preventing overspeeding of said alternator by an improved resonant circuit control.

Although only one embodiment and one application of the invention has been illustrated and described, other changes and modifications in the form and relative arrangement of parts, which will be apparent to those skilled in the art, may be made without departing from the spirit and scope of the invention.

What is claimed is:

1. In a speed governing device for alternator driven by a prime mover, the combination comprising a two phase torque motor, said motor being connected to said alternator, an inductance and a capacitance connected in series between said motor and said alternator, a proportional relay in series with said inductance and capacitance, a second inductance and capacitance connected in series to said alternator, rectifier means across said second capacitance and inductance, differential coils for actuating said relay, the output of said rectifier means being impressed on the differential coils of said relay to cut out said first inductance and capacitance and connect said torque motor directly to said alternator upon an increase in speed of said alternator and prime mover above a predetermined value.

2. In a speed governing device for an alternator, the combination comprising a torque motor, a circuit including an inductance and a capacitance in series connecting said motor to said alternator, a proportional relay in series with said inductance and capacitance, differential coils for actuating said relay, a second inductance and capacitance in series connected directly to said alternator, a rectifier connected across said second inductance to energize one of said coils and a rectifier connected across said second capacitance to energize another of said coils, said relay responsive to the output of said rectifiers to cut out said first inductance and capacitance and connect said motor directly to said alternator upon overspeeding of said alternator.

3. For use as a speed governing device for an alternator having a variable frequency alternating current output; the combination comprising a torque motor, a circuit having a predetermined resonant frequency and including an inductance and a capacitance connected in series for connecting said torque motor to the output of said alternator, a proportional relay having a switch element for normally connecting the output of said alternator to said torque motor through said inductance and capacitance, a second inductance and capacitance in series for connecting said proportional relay to the output of said alternator, rectifier means connected across said second inductance and capacitance to impress a voltage on said relay at alternator output frequencies in excess of said predetermined resonant frequency to affect said switch element so as to cut out said first inductance and capacitance and connect said torque motor directly to said alternator to increase the torque of said motor.

4. For use as a speed governing device for an alternator having a variable frequency alternating current output; the combination comprising a torque motor, an inductance and a capacitance in a series resonant circuit for connecting said torque motor to the output of said alternator so as to proportionately increase the torque of said motor with increase in the output frequency of said alternator from a minimum to a resonant frequency, relay means for controlling said resonant circuit, differential electromagnetic means for operating the relay means, a second capacitance and inductance in a series resonant circuit for connection in the output of said alternator, rectifier means connecting said second capacitance and inductance across the differential electromagnetic means so as to operate said relay means in response to the output of said alternator to effect a maximum motor torque upon the output frequency of the alternator exceeding a predetermined value.

5. For use as a speed governing device for an alternator having a variable frequency alternating current output; the combination comprising a torque motor, a first resonant circuit for connecting said torque motor to the output of said alternator to proportionately increase the torque of the motor with alternator speed from a minimum to a resonant frequency, relay means for controlling said first resonant circuit, differential electromagnetic means for operating the relay means, and a second resonant circuit means connecting said electromagnetic means to the output of said alternator to energize said differential electromagnetic means so as to cause the relay means to discontinue the first resonant circuit upon the output frequency of the alternator exceeding a predetermined value.

ROBERT L. STALLARD.

References Cited in the file of this patent

UNITED STATES PATENTS

| Number | Name | Date |
|---|---|---|
| 649,006 | Steinmetz | May 8, 1900 |
| 1,505,853 | Brainard | Aug. 19, 1924 |
| 1,646,672 | Whitehorn | Oct. 25, 1927 |
| 1,694,637 | Bethenod | Dec. 11, 1928 |
| 1,742,752 | Cady | Jan. 7, 1930 |
| 1,776,592 | MacDonald | Sept. 23, 1930 |
| 1,783,162 | Taylor | Nov. 25, 1930 |
| 1,872,243 | Churcher | Aug. 16, 1932 |
| 1,873,981 | Rump | Aug. 30, 1932 |
| 1,875,329 | Chireix | Sept. 6, 1932 |
| 1,884,043 | Martin | Oct. 25, 1932 |
| 1,959,161 | Grondahl | May 15, 1934 |
| 1,981,040 | Gulliksen | Nov. 20, 1934 |
| 2,001,557 | Von Ohlsen | May 14, 1935 |
| 2,046,438 | Matte | July 7, 1936 |
| 2,151,127 | Logan et al. | Mar. 21, 1939 |
| 2,248,495 | Dupy | July 8, 1941 |
| 2,363,857 | Crever et al. | Nov. 28, 1944 |
| 2,366,167 | Adjorjan | Jan. 2, 1945 |
| 2,401,163 | Keller | May 28, 1946 |
| 2,414,539 | Lindbeck | Jan. 21, 1947 |
| 2,492,513 | Allen | Dec. 27, 1949 |
| 2,496,730 | Lindbeck et al. | Feb. 7, 1950 |

FOREIGN PATENTS

| Number | Country | Date |
|---|---|---|
| 154,908 | Great Britain | Dec. 3, 1920 |